Figure 1:
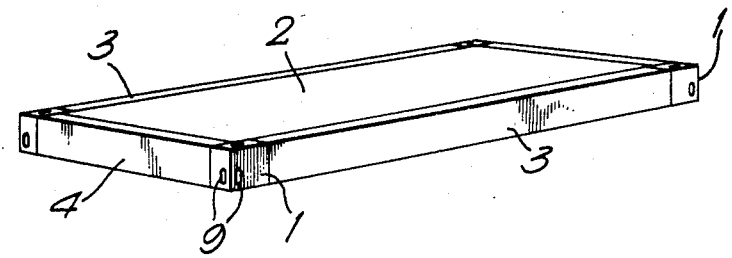

United States Patent [19]

Clive-Smith

[11] Patent Number: 4,591,307
[45] Date of Patent: May 27, 1986

[54] CORNER FITTING WITH RETRACTABLE TWIST LOCK

[76] Inventor: Martin Clive-Smith, 151 Broomwood Road, London SW11 6JU, England

[21] Appl. No.: 567,273

[22] Filed: Dec. 30, 1983

[30] Foreign Application Priority Data

Dec. 30, 1982 [GB] United Kingdom ............... 8236980

[51] Int. Cl.$^4$ ............................................. B65J 1/22
[52] U.S. Cl. ........................................ 410/83; 24/287; 24/591; 403/348
[58] Field of Search ............... 24/287, 590, 591, 593; 403/348, 349, 407; 410/31, 32, 33, 77, 82, 83, 107, 111

[56] References Cited

U.S. PATENT DOCUMENTS

| | | | |
|---|---|---|---|
| 3,507,226 | 4/1970 | Nadherny | 410/83 |
| 3,734,445 | 5/1973 | Werner et al. | 410/83 |
| 3,768,857 | 10/1973 | Horton | 410/83 |
| 3,866,970 | 2/1975 | Schwiebert | 410/83 |
| 3,894,494 | 7/1975 | Erith et al. | 410/83 |
| 3,906,870 | 9/1975 | Alberti | 410/82 X |
| 3,989,294 | 11/1976 | Carr | 410/82 |
| 4,125,077 | 11/1978 | Baaso | 410/82 |
| 4,131,071 | 12/1978 | Glassmeyer | 410/83 X |
| 4,321,000 | 3/1982 | Novak | 410/82 X |

FOREIGN PATENT DOCUMENTS

| | | |
|---|---|---|
| 1395506 | 5/1975 | United Kingdom ............ 410/83 |
| 2070125A | 9/1981 | United Kingdom . |
| 2113752A | 8/1983 | United Kingdom . |

Primary Examiner—Robert B. Reeves
Assistant Examiner—David F. Hubbuch
Attorney, Agent, or Firm—Ladas & Parry

[57] ABSTRACT

A cargo carrier has a frame on which a hollow portion is provided, the hollow portion having a surface with an aperture therein. A locating device, such as a twistlock or location cone, is provided. The locating device can move between a raised position in which a first portion of the device projects through the aperture, and a lowered position in which the first portion is below the apertured surface. In this position a second portion of the locating device defines one end of the aperture in the surface and is effective to guide handling equipment into engagement with the cargo carrier through the aperture. The surface of the second portion of the device is preferably complimentary to the peripheral edge of the opposite end of the aperture.

21 Claims, 15 Drawing Figures

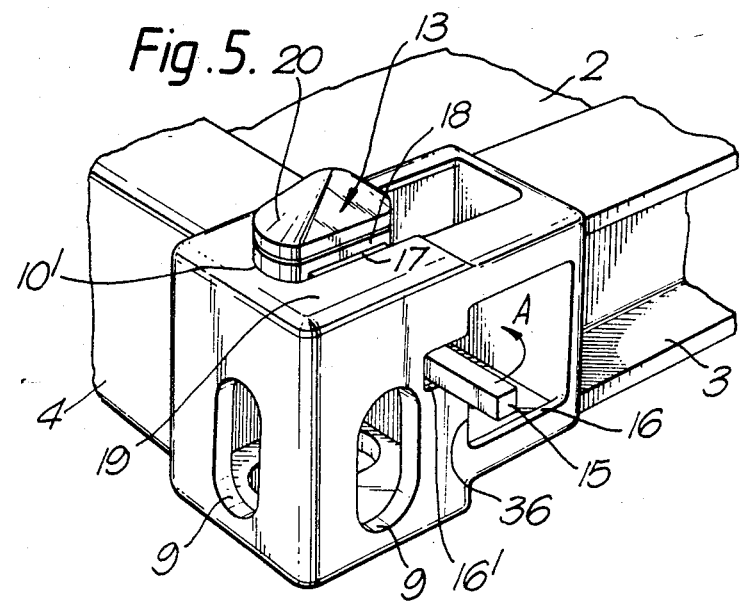
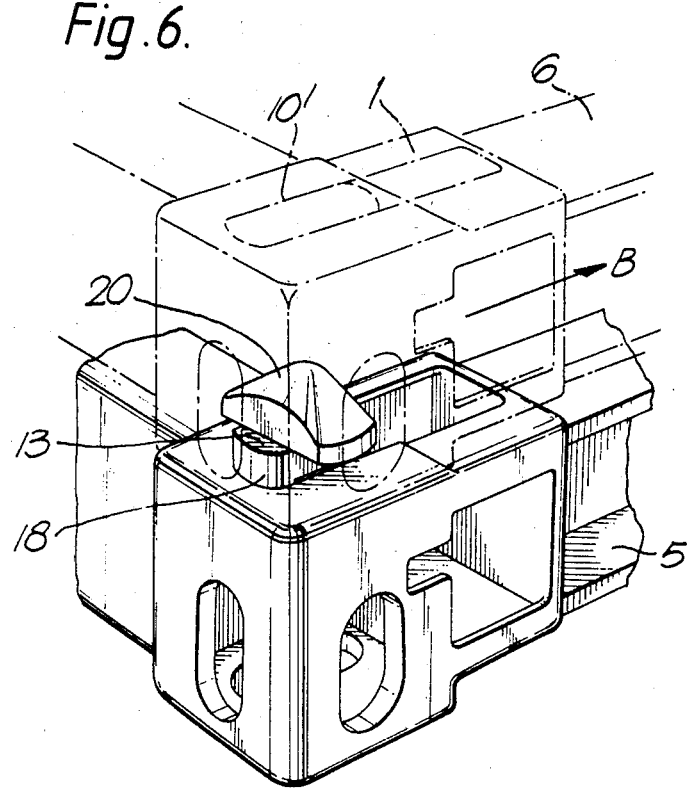

CORNER FITTING WITH RETRACTABLE TWIST LOCK

This invention relates to cargo carriers such as intermodal shipping containers which are commonly used for the transport of goods carried by rail waggons, road trailers, sea going vessels and the like. In order that these containers can be handled, stacked one upon another and lashed in position, their dimensions and strength are standardised, and at their corners they normally have standardised corner fittings. Typical of the type of corner fitting and container are those described in the U.S. patent Specification Ser. No. 3,027,025 of Mar. 27, 1962, which also describes the interlinking twistlock devices herein referred to.

The corner fittings are normally of a rectangular box form which have within their sides, apertures of predetermined shape and size which are suited and matched to specific handling devices, or lashing fixtures and fittings. The shape and size of these apertures are often standardised within a particular series of fittings for a particular series of containers.

It is sometimes required that two or more containers are linked together by some means so that they might be handled as one integral module conforming to the requirements of an individual container. The interlinking devices that are commonly used for linking the containers together do have, however, certain disadvantages.

Since the interlinking devices are separate and generally removable from the containers, they can become lost, damaged through dropping, cannot be stowed within the container easily and require organisation to ensure availability at the right time. Furthermore, it is necessary that there are operating handles or levers to lock the devices into the container corner fittings and these handles may project from the side of the container. Such handles are not satisfactory since, in moving the containers, the containers are often knocked against one another and the handles either damage the other container or are damaged themselves. Another disadvantage is that, if placed between two containers, their thickness adds to the overall dimensions of the combined container module which adds to the space that the module might occupy in a ship or other transport, or displaces the position of the corner fitting apertures to an inconvenient or non-standard place prohibiting standardised handling machinery to be used.

According to the present invention there is provided a cargo carrier comprising frame means having a hollow portion with one surface lying in a major plane of the frame means, an aperture located in the said one surface, locating means movable relative to the said surface to a raised position in which a portion of the locating means projects through the aperture from a lowered position in which the portion of the location means is moved from the aperture to a postion substantially below the major plane such that by said movement to the lowered position a further portion of the location means defines one end of the aperture.

In one preferred embodiment of a cargo carrier according to the invention the shape of the further portion of the location means is complementary with the shape of the opposite peripheral surface of the aperture.

The location means preferably comprises a twistlock having a head and a body means, said head being rotatable about an axis substantially perpendicular to said major plane, the head and body means both being movable relative to the said surface to said raised position in which the head and adjacent portion of the body means project through the aperture from a lowered position in which the head and adjacent portion of the body means is moved from the aperture to a position substantially below the major plane such that by said movement to the lowered position a further portion of the body means defines said one end of the aperture. Conveniently, the further portion comprises the undersurface of the body remote from the head.

Inter-engagement means are preferably provided on the hollow portion of the frame means and twistlock for allowing pivotal movement of the twistlock relative to the hollow portion between the raised and lowered positions. Such inter-engagement means may comprise pivot pins on the twistlock and hooks on the hollow portion.

Preferably, locking means are provided for preventing rotation of the twistlock head. Conveniently the locking means comprises a recess in one of the side walls of the hollow portion of the frame means.

Advantageously, a handle is mounted on the twistlock for rotating the twistlock in two mutually perpendicular planes and the handle is arranged to engage the locking means when the head of the twistlock is in its locked position. The handle may be pivotally mounted on the twistlock or alternatively may be rigidly connected to the twistlock.

The hollow portion of the frame means preferably includes an abutment therein for engaging and rotating the twistlock handle when the twistlock is moved to its lowered position. A bifurcated arm may be provided within the hollow portion for receiving the handle between the arms thereof and preventing rotation of the twistlock in the plane substantially perpendicular to the major plane. The handle may be straight or cranked or any other shape convenient to the operation of the twistlock.

Preferably, the body of the twistlock comprises a collar and tail. Conveniently, support members can be located on the collar of the twistlock for preventing the twistlock from moving into the hollow portion when the twistlock is in its raised unlocked position. One support member is preferably located on each of two oposite sides of the collar, and such support members may have chamfered surfaces which engage with correspondingly chamfered surfaces on the one surface of the hollow portion. Alternatively, the support members may have an elongate rectangular cross-section. Conveniently, stop means are provided on the hollow portion and are arranged to be engageable with one end of at least one of the support members on the collar of the twistlock to prevent lateral movement of the twistlock relative to the axis which is substantially perpendicular to the major plane.

The inter-engagement means on the twistlock is preferably located at one end of the twistlock for engagement with the inter-engagement means of the hollow portion when the twistlock is moved from a raised to the lowered position and when the twistlock is in its unlocked position.

The hollow portion preferably includes a support bar mounted thereon for supporting the end of the twistlock remote from that having the inter-engagement means mounted thereon.

Conveniently, the locking means includes detent means on the twistlock for preventing rotation of the twistlock in the plane perpendicular to the major plane, which detent means comprises a pair of flat elongate springs located one relative to the other on opposite sides of squared surfaces of the rotational shaft of the twistlock.

Preferably, the aperture through which the twistlock projects in its raised position extends into a frame member supporting the hollow portion. The frame member is conveniently an I-sectioned beam and has a further aperture in the cross member of the beam for receiving the twistlock therein in the lowered position of the twistlock.

Therefore there is provided a cargo carrier having a twistlock in a corner fitting which is contained in one assembly and in operation may be moved into place without detachment from the corner fitting. There is also provided means for safely stowing and locking the operating handle without complex mechanisms, and conveniently automatic handle stowage is achieved in certain stages of the operation. The twistlock contained within the corner fitting may cooperate with the fitting apertures to give complete location for handling devices, and in doing so provides a highly compact arrangement.

Figure 2:
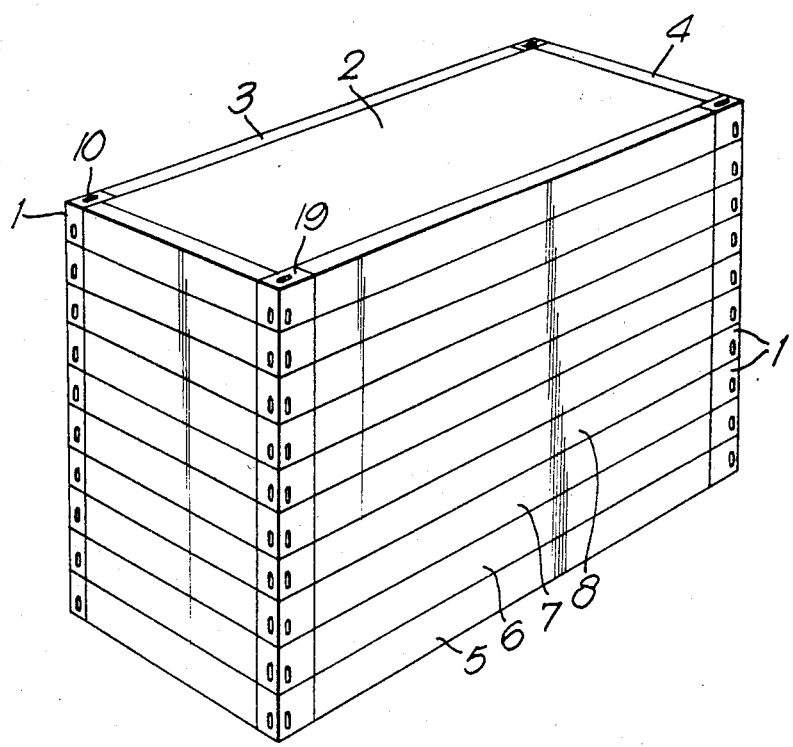
Figure 3:
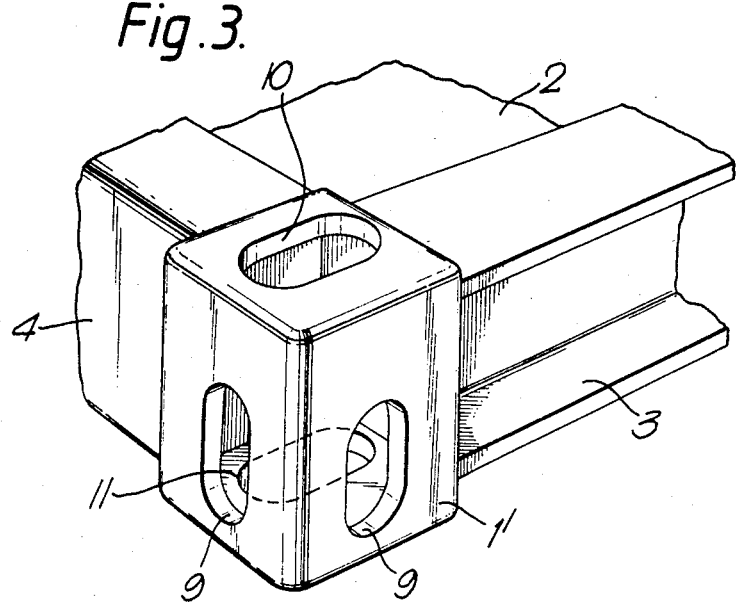
Figure 4:
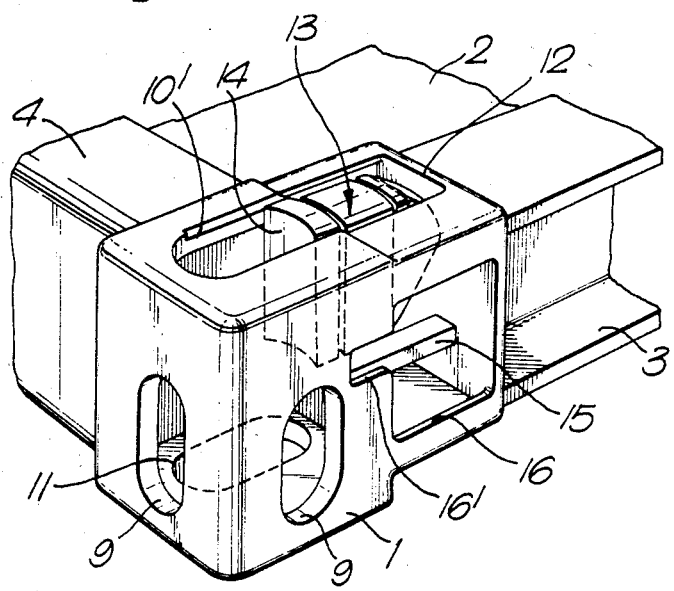

Embodiments of the present invention will now be described by way of example with reference to the accompanying drawings, in which:

FIG. 1 is a perspective view of a typical platform based container upon which goods can be loaded, FIG. 2 is a perspective view of a stack of platform based containers ready for shipment as a single module, FIG. 3 is an enlarged perspective view of an enlarged corner fitting of a cargo carrier with parts of an attached frame member, FIG. 4 is an enlarged perspective view of a corner fitting of a container with parts of attached frame members broken away from the whole container, incorporating a twistlock in its stowed or lowered position enabling normal handling of the container.

Figure 7:
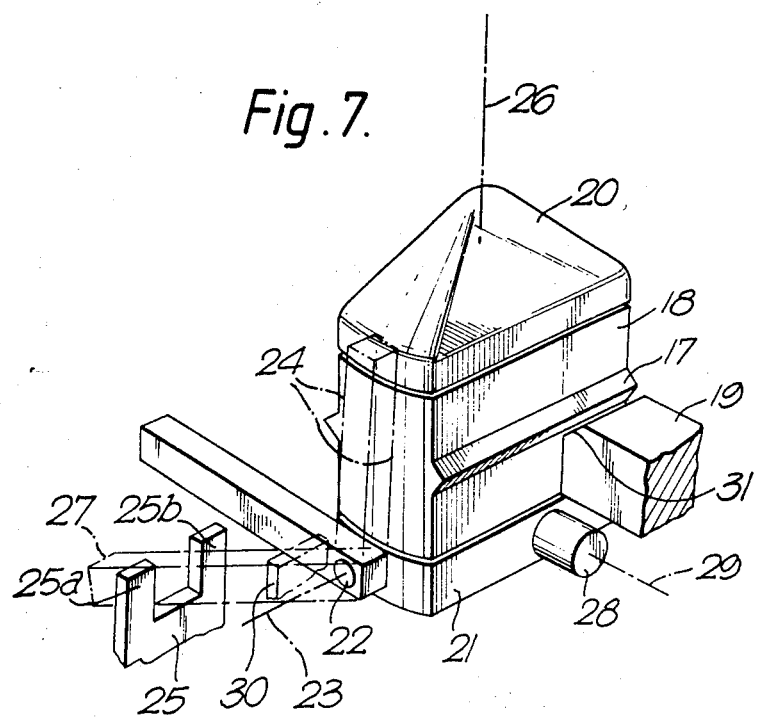
Figure 8:
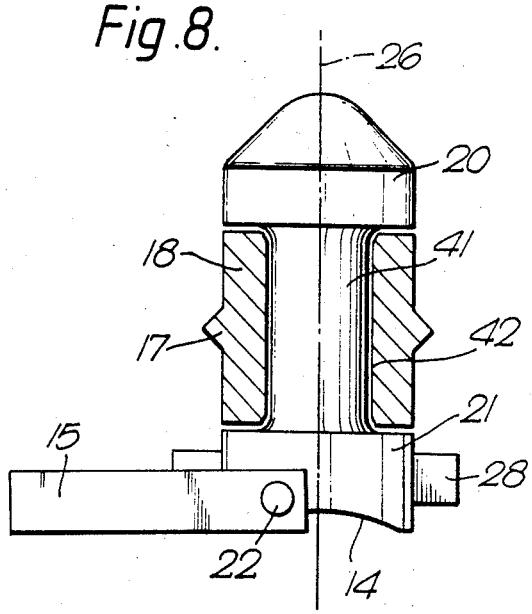
Figure 9:
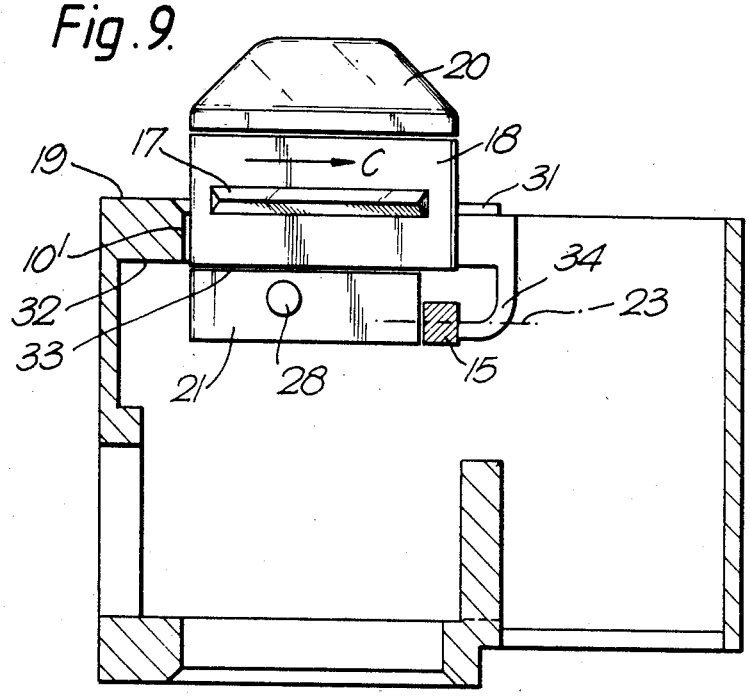
Figure 10:
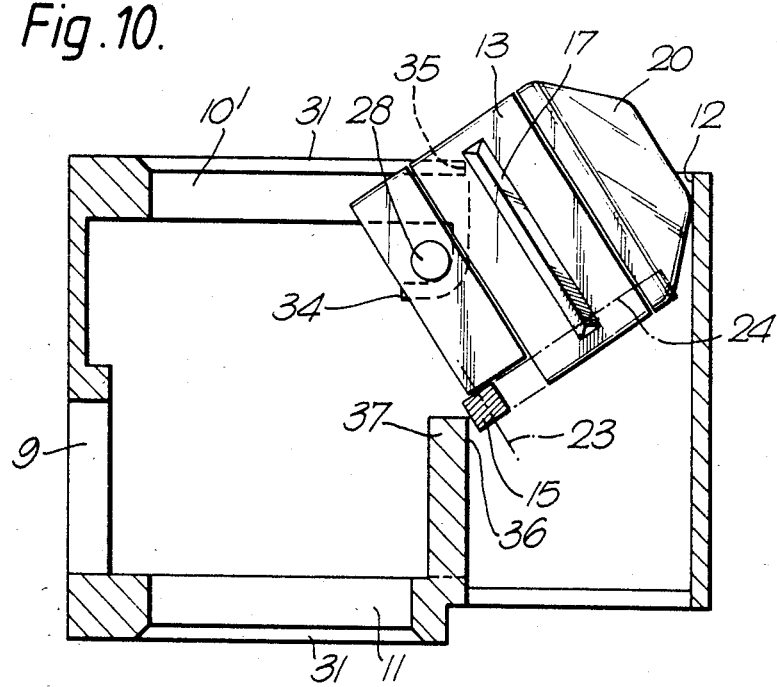
Figure 11:
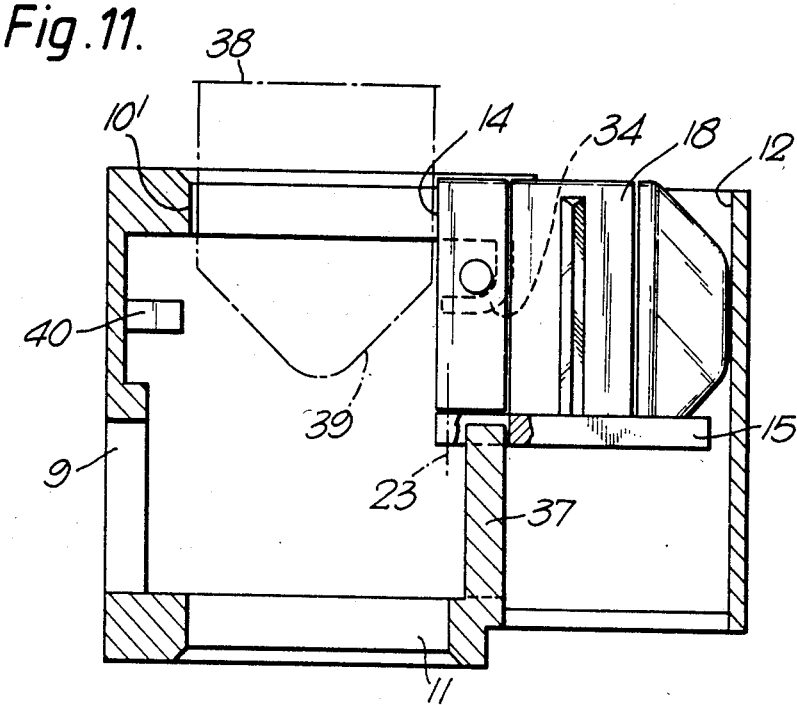
Figure 12:
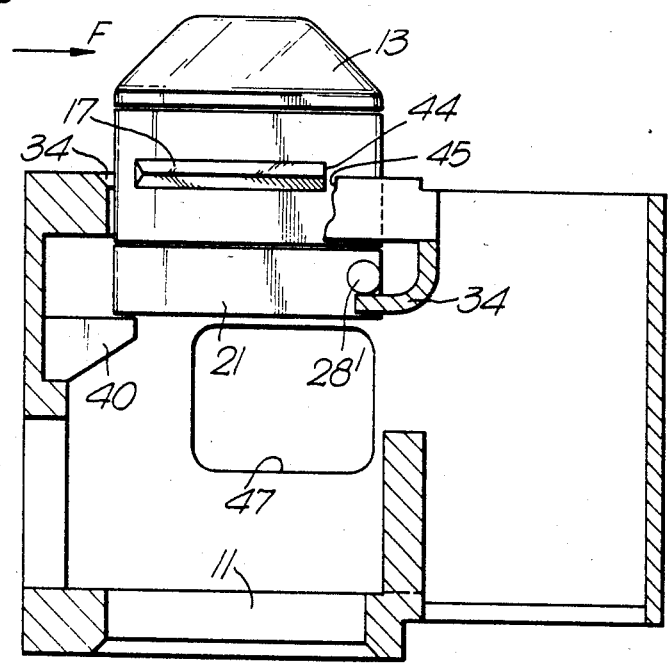
Figure 13:
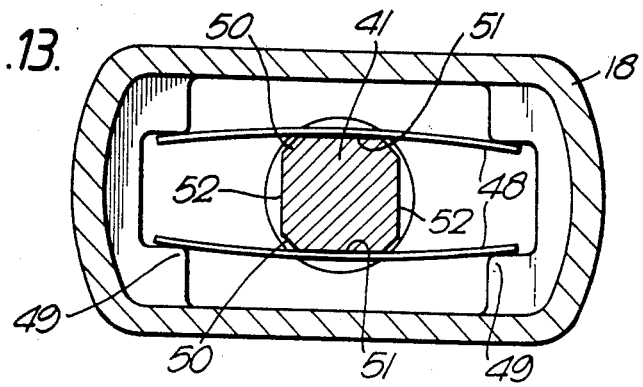
Figure 14:
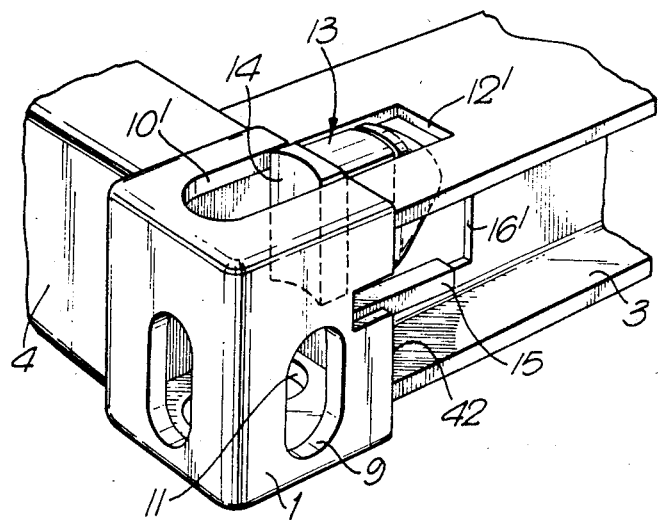
Figure 15:
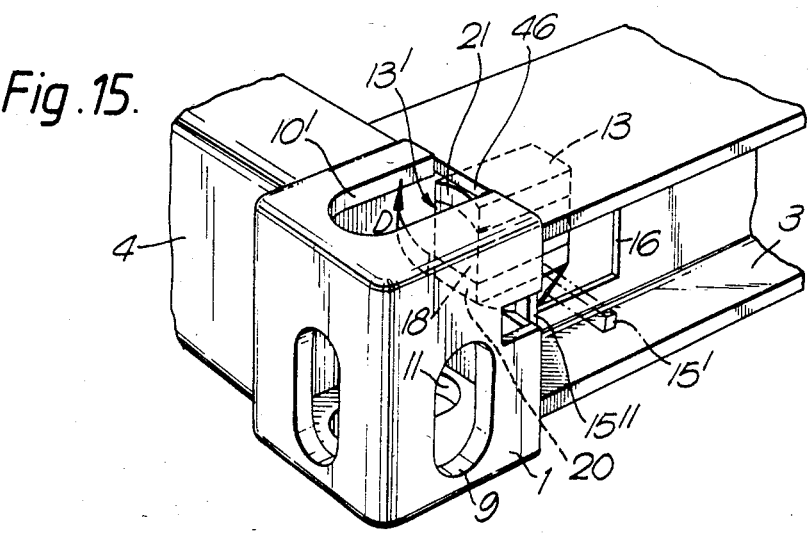

FIG. 5 is a similar view to that of FIG. 4 but with the twistlock in a raised or operative position ready to receive another container corner fitting which is placed and located upon it, FIG. 6 is a similar view to that of FIG. 5 but with the second container corner fitting placed upon it and with the twistlock rotated and locked in position, FIG. 7 is a perspective view of a typical twistlock used in the cargo carrier of the present invention, FIG. 8 is a cross sectional view of the twistlock of FIG. 7, FIG. 9 is a cross sectional view of the complete assembly of a modified twistlock and corner fitting with the twistlock shown in the raised unlocked position, FIG. 10 is a similar view to that of FIG. 9 but with the twistlock in the process of being moved to its stowed position, FIG. 11 is a similar view to that of FIG. 9, but with the twistlock shown in its stowed position ready to receive handling devices applied to the corner fitting, FIG. 12 is a side elevational view of the twistlock and corner fitting showing an alternative arrangement for holding the twistlock in the operational position, FIG. 13 is a cross sectional view through a collar of the twistlock to reveal internal features thereof, FIG. 14 is a perspective view of a further alternative arrangement of the corner fitting which cooperates with frame members of a platform container, and FIG. 15 is a perspective view similar to that of FIG. 14 illustrating an alternative movement of the twistlock.

FIG. 1 illustrates a typical platform based container which may be used for the transport of goods. The goods are placed on deck 2 comprising a rigid plane surface of timber or steel or other suitable material. The deck 2 is supported by two longitudinal side rails 3 and two end rails 4. At the junction of the side and end rails 3, 4 are corner fittings 1. The corner fittings have in their side face handling apertures 9.

FIG. 2 shows a stack of the platform containers of FIG. 1 which having no cargo have been conveniently placed one upon another. Each of the containers 5, 6, 7, 8 etc. have corner fittings 1 which have in their uppermost planar surface 19 a further handling aperture 10. It is convenient to use specially designed handling devices and machines to lift these containers. The handling devices referred to key into the top apertures 10. However, unless the containers 5, 6, 7, 8 etc. are themselves keyed together, only the uppermost container in FIG. 2 can be lifted via the top apertures 10. If conventional interlinking devices are placed between each of the containers 5, 6, 7, 8 etc. the overall height of the stack would be increased adding to the cost of transportation. It is therefore desirable to have an interlinking device contained within the corner fittings 1.

FIG. 3 shows an enlargement of a typical corner fitting 1 having side apertures 9, top aperture 10 and a bottom aperture 11 which is seen through the side apertures 9 and in dotted outline. The aperture 11 is of similar elongate form as the top aperture 10. The size, shape and location of the apertures 9, 10, 11 are of standardised form, enabling standardised handling apparatus to be used wherever the container may need to be handled throughout the world. Attached rigidly to the corner fitting 1' are rails 3, 4 supporting the deck 2. The typical corner fitting 1' comprises a rectangular box being substantially hollow inside so that keying devices can be introduced through the apertures 9, 10, 11 and upon rotation lock themselves to the corner fitting 1'.

FIG. 4 shows an enlarged corner fitting 1 similar to the corner fitting shown in FIG. 3 but incorporating features of the present invention. The corner fitting 1 has side apertures 9, bottom aperture 11, and a top aperture 10' which is open to one end 12 of the corner fitting 1 and which is wider at one end than the other end for reasons to be described below. The aperture 10' is partially closed by a twistlock 13 whose surface 14 is shaped for example concave, to be complementary to the opposite end of aperture 10' and to comply with the requirements of the previously referred to handling apparatus aperture standards. The twistlock 13 is supported rigidly in the position shown to prevent damage thereto by handling equipment that may bear upon it in the same way that the perimeter of apertures 9, 10, 11 would do so. Inside the corner fitting 1 through an access aperture 16 is seen operating handle 15 for the twistlock 13. Being inside the corner fitting 1, the handle 15 is safe from damage that can occur should another container knock against the corner fitting 1. Although the corner fitting 1 is longer than corner fitting 1' of FIG. 3 the corner fitting again comprises a rectangular box with frame members 3, 4 simply attached to it.

FIG. 5 shows the corner fitting 1 of FIG. 4 with the twistlock 13 shown in its raised position projecting through the aperture 10'. The twistlock 13 is supported by elongate projections or support fins 17 on each side of a collar 18 of the twistlock 13. The fins 17 are rigidly attached to the collar 18 and bear onto the surface 19 of the corner fitting 1, preventing the twistlock 13 from falling through the aperture 10'. The twistlock 13 has a conical head 20 so that when a second corner fitting 1 is placed near the head 20, the bottom aperture 11 of the second corner fitting 1 is accurately located upon the first mentioned corner fitting. The twistlock is further retained in the position shown by the handle 15 projecting through recess 16' forming part of aperture 16. The operation of this arrangement is substantially identical to that of the arrangement of FIGS. 9 to 11 to be described below.

FIG. 6 shows in dotted outline a second container 6 which has been placed upon container 5. The head 20 of the device 13 has been rotated by means of the handle 15 not now visible. As indicated in FIG. 5, the position of the head 20 is obtained in rotating the handle in the direction of arrow A thereby rotating the head 20 by means to be described below.

In FIG. 6 and 7, the elongate shape of the head 20 and a tail 21 interconnected therewith, also correspond to the elongate shape of the aperture 11 and prevents them in their rotated position from being withdrawn through the aperture 11 thereby locking the containers 5, 6 together via their corner fittings 1. The collar 18 remains stationary locating apertures 11 and 10' accurately above one another. Whilst the upper corner fitting 1 in dotted lines is arranged to move horizontally in the direction of arrow B because of the length of aperture 10', it is envisaged that there will be a similar corner fitting at the other end of the container with its aperture extending in a direction perpendicular to that of aperture 10' so that the corresponding aperture 10' will restrain movement in the direction of arrow B.

After the head 20 has been rotated to its locked position, FIG. 6, the handle 15 is safely located within the fitting 1, which serves as a reminder or indication that the twistlock 13 is safely locked and ensures that the handle 15 cannot be damaged during container handling. The two containers 5, 6 can now be lifted as one by using the top aperture 10' of container 6.

FIG. 7 shows a twistlock 13 incorporating the features of the present invention. The fins 17 are integrally formed with the collar 18, and project from opposite sides of the collar 18. The tail 21 is of similar cross-sectional shape, in plan view, to that of the head 20 and collar 18 (excluding the fins 17). The handle 15 is pivotally attached to the tail 21 by pivot pin 22. The pin 22 is a loose fitting with the handle 15 so that the handle 15 drops freely under gravity or other force in a plane perpendicular to pivotal axis 23 of the pin 22. The pin 22 is shaped to prevent the handle 15 from sliding off the pin. The handle 15 by virtue of its free movement can be moved to various positions as indicated by the dotted lines 27, 24. In position 27 the handle is captivated, against rotation of the twistlock head about axis 26, within part of a structure 25 of the corner fitting 1. The structure 25 is an arm bifurcated at one end, so that the handle 15 can be located between the two arms 25a and 25b and remain there until lifted. Since the handle 15 can only rotate in one plane perpendicular to the axis 23, and the pivot pin 22 is rigidly attached to the tail 21, the tail 21 is rotatable with head 20 about axis 26 when the handle 15 is released from between the arms of the structure 25. The structure 25 can be positioned in any convenient position to suit any desired locking place or portion of the tail 21. Rigidly attached to and projecting from the tail 21 are lugs 28 which have a common axis 29. The lugs 28 provided to allow the twistlock 13 to rotate about axis 29, and by doing so the handle engages a stop 30 fixed to the corner fitting 1, the handle 15 is then caused to rotate about its pivot pin 22 towards the position 24. The purpose of this aperture will be described below.

A small broken away section, represented by a portion of surface 19 in which aperture 10' is provided, of the corner fitting 1 is shown on the extreme right in FIG. 7. The innermost edge of the aperture 10' has a chamfered surface 31 having a shape which is complementary to that of the fin 17. The bottom aperture 11 has similar chamfered surfaces 31 so that when the collar 18 is in place on top of the corner fitting 1, the fins 17 sit within a 'V' shape formed by the chamfered surfaces 31 on the edges of the overlaying apertures 10', 11 thereby allowing full contact between the upper face 19 of a first corner fitting and the lower face which contains the aperture 11 of a second corner fitting 1, even though the fins 17 bear on the chamfered surfaces 31 preventing the twistlock 13 from falling through the aperture 10'.

FIG. 8 is a sectional view through the twistlock 13. It can be seen that the tail 21 is rigidly attached to the head 20 via a shaft 41. The shaft 41 is located within the collar 18 through a bore 42 passing through the collar 18. The head 20, shaft 41, and tail 21 are rotatable as one about axis 26 within the collar 18 and bore 42 by pressure applied to the handle 15, which itself acts upon the pin 22. The elongate cross-sectional shape perpendicular to the axis 26, of the head 20 and tail 21 ensures that when rotated about axis 26, when the collar 18 is restrained by an aperture 10' and 11, the tail 21 and head 20 are unable to pass through the apertures 10', 11 and thus the fittings 1 of the containers 5, 6 are linked together.

To prevent the head 20 and tail 21 from returning to the non-locking position of the twistlock due to vibration or incorrect operator handling whereupon the containers 5, 6, 7, 8 etc. could become disengaged from one another, the handle 15 is lowered, within the corner fitting 1, into a space between bifurcated arms of a structure similar to part 25 as referred to in FIG. 7, thereby preventing rotation of head 20.

FIG. 9 shows a part sectional side elevational view of a corner fitting 1 with twistlock 13 in the projecting position. The position corresponds to that shown in FIG. 5 with the handle 15 projecting outwards through aperture 16. Although not shown in FIG. 9 the handle is a cranked handle and to accomodate the handle the tail 21 is shorter than the head 20 and collar 18. The support fins 17 are aligned with the chamfered surfaces 31, and the collar 18 partly projects through the aperture 10'. The collar 18 also projects downwardly below the under surface 32 of the corner fitting 1 to allow the upper surface 33 of the tail 21 to overlie the surface 32 when the tail is rotated. One of two open hooks 34 is shown to one side of FIG. 9, and these hooks are in line approximately horizontally with the lugs 28. To move the twistlock 13 to its lowered position shown in FIG. 4, the twistlock 13 is moved in the direction of arrow C by moving the handle 15 in the same direction until the lugs 28 catch in the hooks 34 on either side of the tail 21. In this position the fins 17 are substanstially clear of the chamfered surfaces 31 so that rotational movement of the handle now rotates the twistlock about the lugs 28 within the hooks 34 and the twistlock and fins 17 pass through the wider aperture portion of the aperture 10' towards the one end 12.

FIG. 10 shows the twistlock 13 partly rotated about the axis 29 of the lugs 28. The twistlock 13 cannot move back into the aperture 10' since the fins 17 prevent such movement because they bear on end 35 of the chamfered surfaces 31. The twistlock 13 can neither move to the right since the head 20 is close to the end 12 of the aperture 10'. The cranked handle 15 which projects out through the aperture 16 eventually contacts edge 36 of an abutment 37 within the corner fitting. On impact, the handle 15 rotates about the pin 22 towards the position indicated in broken lines 24 and thereby no longer projects outside the corner fitting 1. During this movement the head 20 cannot rotate relative to the collar 18 because of the mutual restriction provided by the width of aperture 10'.

FIG. 11 shows the twistlock 13 in its finally stowed or lowered position supported on lugs 28 sitting in the hooks 34 prevented from horizontal movement by end wall 12 acting on the head 20, and abutment 37 acting on the underside of collar 18. The handle 15, shown partly broken away to reveal the contact between collar 18 and abutment 37, is located safely inside the fitting. Curved under surface 14 of tail 21, in this position of the twistlock, defines one edge of aperture 10' for accurately guiding handling equipment into aperture 10' and even by distributing forces applied to the edge of aperture 10' by the handling equipment.

A conically shaped lifting device 38 is shown in dotted line entering the aperture 10' and if misaligned with the aperture 10' sloping surface 39 of the device 38 engages the surface 14 of the twistlock 13, to guide the device 38 into the aperture 10'.

Although the twistlock 13 is shown here to be rotated through approximately 90 degrees from its raised position to its lowered position, other arrangements can be made so that the twistlock 13 is moved by lifting, sliding, direct pivoting or other means to the required positions. Other surfaces of the twistlock 13 can be shaped according to the alignment with the aperture 10' to form the closure of the aperture 10'.

Furthermore, other dimensional requirements of the aperture 10 or 10' may be desired so that the twistlock 13 or similar devices can be stowed in other positions.

Various abutments can be provided to prevent the twistlock 13 in its projecting position from movement horizontally, either as an additional mechanism or as a part of the fitting structure 1.

Aperture 10' corresponds in shape to the cross-sectional shape of the twistlock perpendicular to the axis 26, in the same way as fitting 1' of FIG. 3, so that the twistlock 13 projects from inside the corner fitting 1.

The corner fitting 1 has been described in conjunction with platform based containers as shown in FIG. 1 but the corner fittings 1 and twistlocks 13 can be used with any other container, pallet or goods transporting device or vehicle.

The fins 17 of the device 13 can be enlarged so that they rest on the corner fitting surface 19. When a second corner fitting 1 is placed upon the lower corner fitting, as in FIG. 6, the overall height of the two goods carriers is increased by the thickness of the fins 17.

The twistlock 13 is held captive by the shape of the corner fitting 1 and the lugs 28, handle 15 and fins 17, and cannot be stolen or easily removed. Other means of captivation such as chain linkage can be used if required.

It is envisaged that the twistlock can be supplied as one assembly or casting, or can be supplied in a number of parts to be attached to an existing corner fitting similar to corner fitting 1' of FIG. 3.

Other types of handles can be used to rotate the twistlocks 13 with alternative means of preventing the heads 20 from rotating to the unlocked position, such as additional catches or detent springs contained within the collar 18 acting on the shaft 41 or head 20 or tail 21.

FIG. 12, there is illustrated another embodiment of the present invention. The arrangement shown is similar to that of FIG. 9 but without a handle 15 and lugs located at a different location on the tail 21 as described below. The twistlock 13 is shown to be supported in the projecting position by a bar 40 which engages the under surface of the tail 21, and by the lugs 28 supported by the hooks 34. Hence there is no longer any need for fins 17 to provide support for the twistlock 13, but in this instance the fins 17 are provided as shown in FIG. 12 to restrict horizontal movement of the twistlock in the direction of arrow F. Accordingly, in FIG. 12 the fins 17 are shown to terminate at face 44. Likewise the chamfered surfaces 31 on surface 19 terminate at face 45 near to the face 44. In operation, if a horizontal force denoted by arrow F, such as sometimes received during the handling operation, should cause the twistlock 13 to slide horizontally away from the force, the faces 44 and 45 contact and by doing so, the twistlock 13 will be prevented from moving out of its operational position.

An aperture 47 is formed in the side of the corner fitting 1. In operation it is desirable to have access to the tail 21 of the twistlock 13 when in the raised position in order to rotate the head 20 into the locked position shown in FIG. 6. In such an arrangement, the handle 15 is omitted and the rotational movement of the head 20 inside the collar 18 is controlled by use of detent springs located within the collar 18.

FIG. 13 is a sectional view of one such detent spring arrangement. Springs 48 are supported by shoulders 49 formed as part of the collar 18. The springs 48 act upon the shaft 41 which as seen in FIG. 8 interconnects the head 20 and tail 21. The shaft 41 is shaped to have a square section with flat faces 51, 52 at this point so as to form a stable equilibrium with the springs 48 and thereby resist rotational movement of the shaft 41. Corner faces 50 are also provided to facilitate rotation of the shaft 41. If the shaft 41 is caused to rotate, the corners of the shaft 41 will cause the springs 48 to deflect and thereby increase the resistance of the springs to the rotation of the shaft 41. The rotation continues until the faces 52 act on the springs 48 and thus the shaft 41 supported in a second state of equilibrium until again caused to rotate.

With this construction it is not necessary to provide a handle such as the handle 15 or the locking arrangement provided by both the handle 15 and bifurcated structure 25. Alternatively, a handle 15 can be provided without the pivot 22 but rigidly attached to the tail 21, which handle 15 may project in any direction suited to the operation of the twistlock 13.

In FIG. 14 the corner fitting 1 is shown to terminate at face 42 and the side rail 3 abuts this face 42. Within the side rail 3 itself are provided apertures 12' and 16' which correspond to the apertures 12 and 16 seen in FIG. 4. By forming the apertures 12', 16' in the side rail 3, the overall size of the corner fitting 1 can be reduced whilst still maintaining the operational features of the apertures 12, 16 as previously described with reference to FIGS. 9, 10.

In the arrangement shown in FIG. 15, in which the twistlock is supported similarly to the twistlock of FIG. 12, the twistlock 13 is shown in dotted lines in the lowered position. There is no aperture 12' as in FIG. 14 cut into the side rail 3 and no fins 17. The twistlock 13 in this arrangement is rotated from within the side rail 3, through the corner fitting 1 as indicated by arrow D out through the aperture 10'. The twistlock 13 is then moved horizontally within the aperture 10' until the tail 21 is supported by both the bar 40 and by lugs 28 held in hooks 34 as shown in FIG. 12. The elongate top aperture 10' is then closed by the collar 18, tail 21 and head 20 which are shaped to suit the geometric requirements of the handling devices. The reverse movement is used to move the twistlock to its lowered position.

In stowing the handle 15 the handle is rotated from a horizontal position 15' shown in dotted line to a vertical position 15" outside the corner fitting adjacent end face 42 thereby preventing accidental rotation of the twistlock 13 about the lugs 28, held within hooks 34, into the cavity within the corner fitting 1 where the twistlock might interfere with handling devices keying into the apertures 9, 10.

While the embodiments disclosed herein refer to arrangements in which the twistlock is rotatable from the operative position to the non-operative position, it is considered such movement can be effected by manually lifting the twistlock from the aperture 10' and placing the twistlock in the non-operative position within the extremities of the frame with one surface defining an extremity of the aperture 10'. In this instance the twistlock is attached to the frame by a chain. Any one of the surfaces of the twistlock is shaped to conform with the shape of the opposing peripheral surface of the aperture 10.

Whilst the present invention has been disclosed herein in relation to a twistlock located within a corner fitting, the invention is equally applicable to the provision of a locating cone which is movable between raised and lowered positions as described in the embodiments above for the twistlock, and which has a surface thereon which in the lowered position defines one end of aperture 10' in the planar surface 19 of the hollow corner fitting in the same manner as surfaces 13' and 14 previously referred to. In its raised position cone projects through aperture 10' and serves to locate another carrier thereon.

In FIG. 15 the aperture 10' is again defined by a surface 13' of the twistlock which projects inwardly of a face 46 of the frame 3 towards the opposite end of aperture 10'. The shape of the twistlock surface 13' is complementary to that of the opposite end of the aperture 10' and is effective to guide handling devices for example passed into the aperture 10'.

I claim:

1. A cargo carrier including frame means, a hollow member mounted on the frame means, one surface of the hollow member defining an aperture therein and arranged to lie in a major plane, and location means mounted on the hollow member for movement between a raised position and a lowered position, the location means comprising a first portion arranged to project through said aperture in said one surface when the location means is in said raised position, and a second portion arranged to define one end of the said aperture in said one surface when the first portion of the location means is in the lowered position of the location means below the major plane.

2. A carrier as claimed in claim 1, wherein the shape of said second portion of the location means is complementary with the shape of the opposite peripheral surface of the said aperture.

3. A carrier as claimed in claim 2, wherein said location means comprises a twistlock.

4. A carrier as claimed in claim 3, wherein said twistlock includes a head and a body means, said head being arranged to rotate about an axis substantially perpendicular to said major plane when the twistlock is in said raised position, the head and body means both being arranged to be movable relative to the said surface of the hollow member to said raised position in which said head and an adjacent portion of the body means are arranged to project through said aperture from said lowered position in which the head and said adjacent portion lie substantially below the major plane, said body means being arranged to define said second portion constituting one end of the said aperture.

5. A carrier as claimed in claim 4, wherein said second portion comprises the undersurface of said body means remote from said head.

6. A carrier as claimed in claim 5, including interengagement means mounted on said hollow member and said twistlock for allowing pivotal movement of the twistlock relative to said hollow member between the raised and lowered positions.

7. A carrier as claimed in claim 6, wherein the interengagement means comprises pivot pins on said twistlock and hooks on the hollow member.

8. A carrier as claimed in claim 7, including locking means for preventing rotation of said twistlock head.

9. A carrier as claimed in claim 8, wherein one side wall of said hollow member defines a recess therein constituting said locking means.

10. A carrier as claimed in claim 9, including a handle mounted on the twistlock for rotating the twistlock about two mutually perpendicular axes, one of which is substantially perpendicular to said major plane.

11. A carrier as claimed in claim 10, wherein said handle is pivotally mounted on said twistlock.

12. A carrier as claimed in claim 11, including an abutment within the hollow member for engaging and rotating the twistlock handle when the twistlock is moved from its raised to its lowered position.

13. A carrier as claimed in claim 4, wherein the body means of the twistlock comprises a collar and tail.

14. A carrier as claimed in claim 13, including support members located on said collar of said twistlock for preventing said twistlock from moving into said hollow member when said twistlock is in its raised position.

15. A carrier as claimed in claim 14, wherein said support members have chamfered surfaces which are arranged to engage with correspondingly chamfered surfaces on the one surface of said hollow member.

16. A carrier as claimed in claim 15, including stop means formed on said hollow member and arranged to be engageable with one end of at least one of said support members on said collar of said twistlock to prevent lateral movement of said twistlock relative to the axis which is substantially perpendicular to the major plane.

17. A carrier as claimed in claim 6, wherein the interengagement means on said twistlock is located at one end of the twistlock for engagement with said interengagement means of the hollow member when said twistlock is moved from the raised to the lowered position and when said twistlock is in its raised position.

18. A carrier as claimed in claim 17, including a support bar mounted on the hollow member for supporting the end of the twistlock remote from that having the interengagement means mounted thereon.

19. A carrier as claimed in claim 8, wherein the locking means includes detent means on said twistlock for preventing rotation of said twistlock about an axis perpendicular to the major plane, which detent means comprises a pair of flat elongate springs located one relative to the other on opposite sides of squared surfaces of a rotational shaft of said twistlock interlinking said head and said tail.

20. A carrier as claimed in claim 1, wherein said aperture through which said location means projects in its raised position extends into part of the frame means on which the hollow member is mounted.

21. A carrier as claimed in claim 20, wherein the said part of the frame means is an I-sectioned beam having a web with flanges at each end, and the web defines an aperture therein for receiving said location means in the lowered position of said location means.

* * * * *